United States Patent
Hortner

(10) Patent No.: US 11,334,076 B2
(45) Date of Patent: May 17, 2022

(54) SYSTEM FOR CONTROLLING UNMANNED AERIAL VEHICLES IN A FLIGHT FORMATION IN ORDER TO FILM A MOVING OBJECT USING SEVERAL CAMERAS

(71) Applicant: ARS ELECTRONICA LINZ GMBH & CO KG, Linz (AT)

(72) Inventor: Horst Hortner, Kleinzell (AT)

(73) Assignee: ARS ELECTRONICA LINZ GMBH & CO KG, Linz (AT)

( * ) Notice: Subject to any disclaimer, the term of this patent is extended or adjusted under 35 U.S.C. 154(b) by 258 days.

(21) Appl. No.: 16/611,573

(22) PCT Filed: May 23, 2018

(86) PCT No.: PCT/AT2018/060103
§ 371 (c)(1),
(2) Date: Nov. 7, 2019

(87) PCT Pub. No.: WO2018/213860
PCT Pub. Date: Nov. 29, 2018

(65) Prior Publication Data
US 2020/0201331 A1    Jun. 25, 2020

(30) Foreign Application Priority Data

May 23, 2017  (AT) ........................ GM 50095/2017

(51) Int. Cl.
*G05D 1/00*       (2006.01)
*B64C 39/02*     (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC ............... G05D 1/0027; B64C 39/024; B64C 2201/12; B64C 2201/143; B64C 2201/145; G08G 5/0039; G08G 5/006
See application file for complete search history.

(56) References Cited

U.S. PATENT DOCUMENTS 9,104,201 B1    8/2015 Pillai et al.
9,442,485 B1    9/2016 McDermott et al.
(Continued)

FOREIGN PATENT DOCUMENTS

DE    102005020594 A1    11/2006
FR        3037429 A1    12/2016
(Continued)

OTHER PUBLICATIONS

Secuk Bayraktar et al: "Hybrid Modeling and Experimental Cooperative Control of Multiple Unmanned Aerial Vehicles", Dec. 1, 2004 (Dec. 1, 2004), XP055494404, Retrieved from the internet: URL:https://repository.upenn.edu/cgi/viewcontent.cgi?article=1022 &context=cis_reports.
International Search Report dated Aug. 1, 2018 from International Patent Application No. PCT/AT2018/060103 filed May 23, 2018.

*Primary Examiner* — Peter D Nolan
*Assistant Examiner* — Kenneth M Dunne
(74) *Attorney, Agent, or Firm* — Workman Nydegger

(57) ABSTRACT

A system for controlling at least two unmanned aerial vehicles in a flight formation, wherein each aerial vehicle has a flight control unit for controlling the flight path of the aerial vehicle and a camera that may be rotated by an orientation means about one axis, wherein in the system there is provided a flight formation control unit for the wireless communication with the aerial vehicles. The flight formation control unit is configured to control the flight control units and the orientation means during a recording of a moving object that will be filmed so that a spatial arrange-
(Continued)

ment of the aerial vehicles in relation to the object and the orientation of the optical axis of each camera in relation to the object and/or in relation to the orientation(s) of the optical axis/axes of the other camera(s) is substantially maintained and optionally adjusted substantially in real time.

12 Claims, 2 Drawing Sheets

(51) Int. Cl.
*B64D 47/08* (2006.01)
*G05D 1/10* (2006.01)

(52) U.S. Cl.
CPC ........ *G05D 1/104* (2013.01); *B64C 2201/127* (2013.01); *B64C 2201/143* (2013.01)

(56) References Cited

U.S. PATENT DOCUMENTS

| | | |
|---|---|---|
| 2007/0288132 A1 | 12/2007 | Lam |
| 2017/0178515 A1* | 6/2017 | Brune ................ G08G 5/006 |
| 2017/0220037 A1 | 8/2017 | Berestov et al. |
| 2017/0235308 A1* | 8/2017 | Gordon ............. B64C 39/024 |
| | | 701/2 |
| 2017/0313416 A1* | 11/2017 | Mishra ............... G06K 9/0063 |
| 2018/0101169 A1* | 4/2018 | Applewhite ........ G08G 5/0069 |
| 2018/0128625 A1* | 5/2018 | Kwon ................. G05D 1/104 |
| 2019/0049945 A1* | 2/2019 | Moeller .............. H04N 5/247 |
| 2019/0196513 A1* | 6/2019 | Zhou .................. B64C 39/024 |

FOREIGN PATENT DOCUMENTS

| | | | |
|---|---|---|---|
| WO | WO-2016015943 A1 * | 2/2016 | ........ G05D 1/0011 |
| WO | 2016/053438 A2 | 4/2016 | |
| WO | 2017/003538 A2 | 1/2017 | |

\* cited by examiner

SYSTEM FOR CONTROLLING UNMANNED AERIAL VEHICLES IN A FLIGHT FORMATION IN ORDER TO FILM A MOVING OBJECT USING SEVERAL CAMERAS

The present application is a U.S. National Stage of International Application No. PCT/AT2018/060103, filed on May 23, 2018, designating the United States and claiming the priority of Austrian Patent Application No. GM 50059/2017 filed on May 23, 2017. All of the aforementioned applications are incorporated herein in their respective entireties by this reference.

The invention relates to a system for controlling at least two unmanned aerial vehicles in a flight formation, wherein each aerial vehicle has a flight control unit for controlling the flight path of the aerial vehicle by means of a drive unit and a camera that may be rotated by an orientation means about at least one axis, wherein in the system there is provided at least one flight formation control unit for the wireless communication with the aerial vehicles.

The developments made in the recent years in the technical field of "Unmanned Aerial Vehicles" (UAV), in particular in the field of "drones" or "multicopters", respectively, have resulted in the increased use of such aerial vehicles for the image recording of objects. For example, a coordinated system of several aerial vehicles, in particular aerial vehicles in a flight formation, may take a photo of and/or film an object simultaneously from different views.

The use of such a flight formation for the film recording of objects, however, in particular if the objects, for example, vehicles, are moving during the recording, is possible only conditionally or not at all, as, among others, the flight paths of the individual aerial vehicles as well as the orientations of the cameras have to be permanently adjusted, which may be too demanding for the hardware and software used in aerial vehicles and control units. Further challenges are a result of the safety requirements. There are to be maintained, for example, safety distances in relation to the objects to be filmed, in particular persons, and the other aerial vehicles in the system.

The invention is based on the task to provide a system for the improved control of unmanned aerial vehicles in a flight formation, which enables the film recording of moving objects, wherein the disadvantages and challenges mentioned above should be at least reduced.

According to the invention, this task is solved by the at least one flight formation control unit being configured to control the flight control units and the orientation means during a recording of at least one moving object to be filmed in a way such that a spatial arrangement of the aerial vehicles in relation of the object and the orientation of the optical axis of each camera in relation to the object and/or in relation to the orientation/s of the optical axis/axes of the other camera/s is substantially maintained and optionally adjusted substantially in real time.

In the system according to the invention, the control of the aerial vehicles and of the cameras is assumed and coordinated by at least one shared flight formation control unit. Thereby, the flight formation control unit advantageously controls in particular the spatial arrangement of the aerial vehicles and the orientation of the cameras in relation to the object/s to be filmed. In this way, there is made possible, for example, for the very first time the use of such a system with commercially available drones and cameras. At the same time, the control of a pre-determined combination and/or sequence of recordings of the different cameras is being facilitated, whereby the plannability and feasibility of filmic scenes is improved and the efforts associated therewith may be reduced.

In an advantageous embodiment the at least one flight formation control unit is configured to control, in particular activate and deactivate, the cameras. In this way, the control of the aerial vehicles may be combined advantageously with the control of recording sequences, in particular the temporal sequence of photo and/or film recordings of the cameras.

If the spatial arrangement of the aerial vehicles, and consequently of the cameras, in relation to the object follows determined geometric relationships, for example a circular arrangement of the cameras in a "camera ring", then there will occur a further unexpected technical effect. By the fact that the camera ring may be moved by means of the flight formation control unit in a coordinated way through space, there may be recorded a scene, in particular a motion sequence of an object to be filmed, such as, e.g., a driving car, a flying airplane or a falling parachutist, which by far exceeds the diameter of the camera ring, if the camera ring and the scene are moved through space in a spatially and temporally coordinated way. This is not possible with the systems or methods known from prior art, which, for example, are based on a fixed and spatially limited arrangement of cameras in a "bluescreen"/"green screen" studio, as the scene to be filmed has to be situated always inside of the stationary camera ring such that recordings with objects moving far beyond the camera ring or with very large objects are not possible or only to a limited extent. In order to determine the "virtual camera shoot" from the different recordings, with these known systems or methods there has to be usually made use, in addition, of the very cumbersome support by CGI ("Computer Generated Imagery").

Because of the system according to the invention, consequently, there may be used for the very first time recording methods with film effect so far not achieved, for example, the "spatial flow motion" or "bullet time" method, for correspondingly moving or correspondingly large objects. The corresponding "movement" or the corresponding "motion sequence", respectively, of the objects/s is hereby related to a translational movement to an extent larger than a conventional film set, for example a "bluescreen"/"green screen" studio, for such recordings.

If the aerial vehicles are usefully arranged in the spatial arrangement along an substantially plane or spiral-like orbit around a central axis, wherein the object to be filmed is preferably situated in the area of the central axis, wherein the distances between neighbouring aerial vehicles along the orbit are preferably substantially equal and the orbit extends in an, optionally projected, orbit plane at an angle of at least 90 degrees, preferably of at least 180 degrees, more preferred of at least 270 degrees, especially preferred of at least 360 degrees, then there may, for example, be used the "spatial flow motion" or the "bullet time" method for correspondingly moving objects.

Alternatively, if the aerial vehicles are arranged in the spatial arrangement along a substantially straight line, wherein the object to be filmed moves preferably substantially in parallel to the line and the distances between neighbouring aerial vehicles along the line are preferably substantially equal, then there may be used, for example, a simplified form of the "spatial flow motion" or "bullet time" method.

At least one of the aerial vehicles has advantageously at least two cameras, wherein the cameras are attached in a stationary geometrical arrangement, preferably along a substantially plane or spiral-like orbit, at the aerial vehicle or the orientation means, or at least two aerial vehicles together have at least two cameras, wherein the cameras are attached in a stationary geometrical arrangement, preferably along an substantially plane or spiral-like orbit, at a shared holding means or a shared orientation means. In this way, by means of a number or only a small number, for example, four, of stationary geometrical arrangements of cameras, which are attached at one and/or several (shared) holding means or orientation means of one and/or several, for example, four, aerial vehicle/s, the spatial arrangement of the aerial vehicles and/or of the cameras may be advantageously be provided, for example, a complete circle of 360 angular degrees by means of four stationary geometric arrangements in quadrants of each 90 angular degrees, wherein each stationary geometric arrangement is attached at an aerial vehicle.

The flight formation control unit advantageously maintains the orientation of the optical axis of a camera in relation to the orientation/s of the optical axis/axes of the other camera/s and/or adjusts the orientation of this optical axis in a way such that a field of vision or a range of vision of this camera is free of an aerial vehicle and/or a camera of the system.

In an advantageous embodiment of the system the aerial vehicles each have at least one sensor unit for establishing distance information, wherein the flight formation control unit is configured to maintain and/or adjust the arrangement of the aerial vehicles and/or the optical axes of the camera by means of the distance information.

In a further advantageous embodiment of the system the object to be filmed has a position determining means for establishing the positions thereof, wherein the flight formation control unit is configured for the wireless communication with the position determining means and is further configured to maintain and/or adjust the arrangement of the aerial vehicles and/or the optical axes of the cameras by way of the positions of the object to be filmed.

In an alternative embodiment of the system each aerial vehicle has a, preferably modular, flight formation control unit, which is configured to control the flight control unit and the orientation means of the aerial vehicle and for the wireless communication with the other flight formation control units. In this way, there may optionally be omitted an external flight formation control unit, for example, a ground flight formation control unit.

The invention further provides a method for the wireless control of at least two unmanned aerial vehicles in a flight formation by means of at least one flight formation control unit, wherein each aerial vehicle has a flight control unit and a camera that may be rotated by means of an orientation means at least about one axis, wherein the at least one flight formation control unit is configured to control the flight control units and the orientation means by way of the following method steps:

A) controlling the aerial vehicles into a spatial arrangement in relation to at least one object to be filmed;

B) orienting the optical axis of each camera in relation to the object and/or in relation to the orientation/s of the optical axis/axes of the other camera/s;

C) maintaining and optionally adjusting, substantially in real time, the spatial arrangement of the aerial vehicles in relation to the moving object and the orientation of the optical axis of each camera in relation to the moving object and/or in relation to the orientation/s of the optical axis/axes of the other camera/s.

The system according to the invention and the method according to the invention enable, among others, to take a photo of and/or film at least one moving object at angles that are predetermined or established substantially in real time, wherein there is being ensured that (i) no other cameras and no other aerial vehicles appear within the vision of field of a camera, and wherein there is enabled that (ii) the "virtual camera shoot" may be pivoted not only in a plane about the object but may rather assume different heights and angles.

In the following, the system according to the invention and the method according to the invention are explained in greater details in a non-limiting way by means of exemplary embodiments depicted in the drawings.

Figure 1:
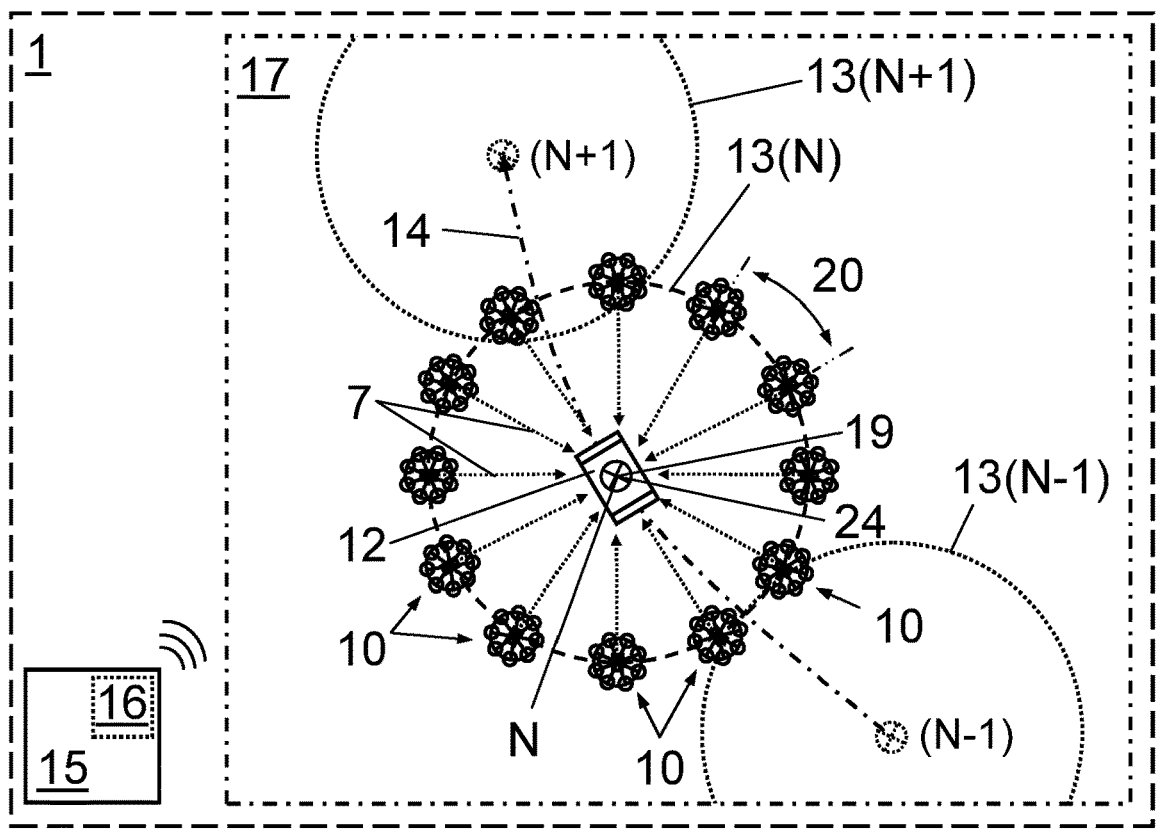
FIG. 1 shows in a schematic view from above a system according to a first embodiment of the invention.

FIG. 1 shows as an example an inventive system 1 according to a first embodiment. The system 1 has a flight formation control unit configured as an independent ground flight formation control unit 15. The ground flight formation control unit 15 is configured, via a communication unit 16 formed as a radio unit, for the wireless communication with a plurality, in the present example twelve (12), of unmanned aerial vehicles 10 of the system 1. In the praxis, however, there may be provided up to several hundreds (100) of aerial vehicles 10.

The hardware of the ground flight formation control unit 15 may, for example, be a commercially available computer, a laptop computer, a tablet computer or a smartphone. The communication unit 16 may communicate via any type of wireless communication known from prior art with the aerial vehicles 10, allowing for a respective range.

Figure 2:
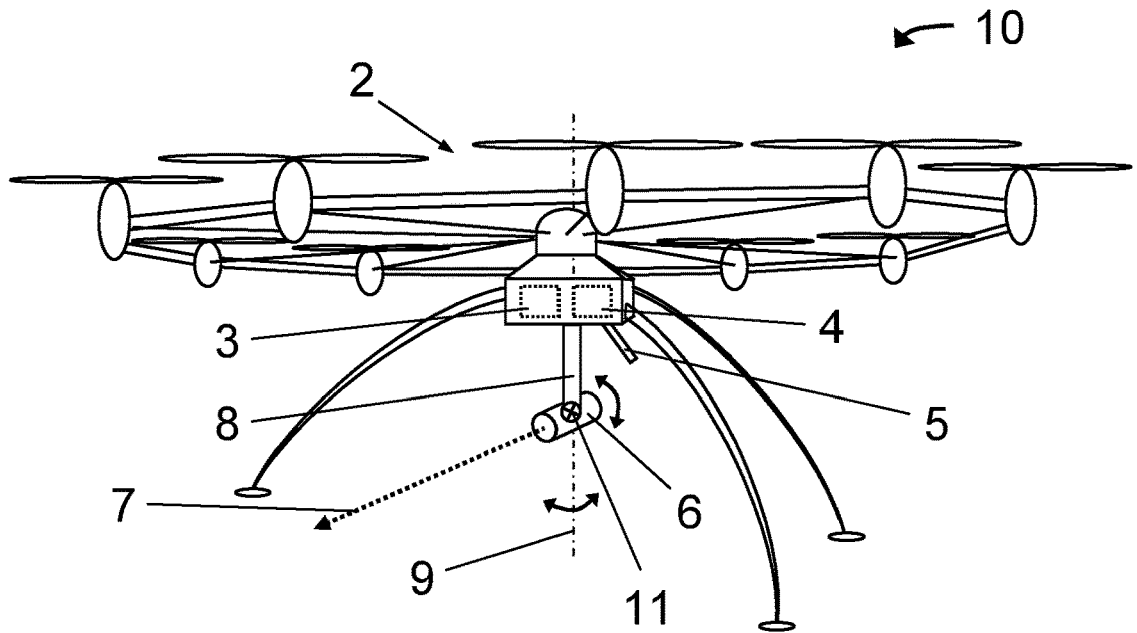
FIG. 2 shows in a schematic perspective an unmanned aerial vehicle for the use in a system according to the invention.

FIG. 2 shows as an example an unmanned aerial vehicle 10 for the use in the system 1. The aerial vehicle 10 may then be configured as a commercially available drone manufactured for a single flight, more particularly a so-called "octocopter". In this regard, a drive unit 2 of the aerial vehicle 10 is thus formed of eight rotor units, which are, for example, driven by means of eight electric motors. The drive unit 2 provides for the flight of the aerial vehicle 10 in air space.

An "octocopter" is a variant of a "multicopter" having eight rotor units. The aerial vehicle 10 may alternatively be formed as another variant of a multicopter, for example, a commercially available "quadcopter" having four rotor units, etc., wherein substantially any number of rotor units is possible. The unmanned aerial vehicle 10 may also be configured as any aerial vehicle that may be stabilized in its position in air space (such as a zeppelin or balloon).

The term "air space" thus refers to any possible space above an artificial or natural ground within or outside of an artificial or natural space or a building, respectively.

The aerial vehicle 10 further has a flight control unit 3, which is configured to control the drive unit 2 of the aerial vehicle 10 in air space in order to control the flight path of the aerial vehicle 10. The flight control unit 3 receives control information from the ground flight formation control unit 15, for example, via a communication unit 5 at the aerial vehicle 10. Using the ground flight formation control unit 15 it is thus possible to control the aerial vehicle 10 at a determined flight velocity at determined positions according to position information in air space. For this purpose, the drive unit 2 is correspondingly controlled by the flight control unit 3. The aerial vehicle 10, as a consequence, will not require any further technical functionality and/or "intelligence" in order to perform a flight path in air space. The position information is received or transmitted substantially in real time, whereby smooth communication will be ensured and whereby the position in air space to be assumed by the aerial vehicle 10 may be optionally updated at any point of time.

The position information may be stored alternatively or additionally in a storage unit 4. The flight control unit 3 may also receive the position information from the storage unit 4 and thus accordingly control the aerial vehicle 10, wherein optionally the ground flight formation control unit 15 monitors and/or adjusts the flight path. In addition, the flight control unit 3 may transmit the current position information to the storage unit 4, where it is stored, for example, as a control or backup.

The position information are, for example, "Global Positioning System" (GPS) based three-dimensional coordinates in air space, this is, for example, data in the GPS Exchange Format (GPX). The data in the GPX format may contain geo-data, this is the geographical coordinates of altitude, latitude and height. Each aerial vehicle 10, the ground flight formation control unit 15 and/or each flight control unit 3 in this regard have optionally a GPS receiver. Alternatively, the data may also be based on the Galileo, GLONASS, Beidou/Compass or any other satellite navigation and/or timing system or on a local or building-based navigation system for the position determination of the aerial vehicle 10 within and outside of buildings (such as position determination by way of transfer of sending signals, optical position determination systems, etc.). The flight path of the aerial vehicle 10 corresponds to a temporal sequence of positions, which may also be data in the GPX format. The extent of the temporal sequence will determine the flight velocity of the aerial vehicle 10.

The, several or every aerial vehicle 10 further has a camera 6 for the pictorial recording of an optionally moving object 12. In the example of FIG. 1, the object 12 is configured as an automobile. The ground flight formation control unit 15 is configured to control, in particular activate and deactivate, the cameras 6. If the cameras 6 are controlled by the ground flight formation control unit 15, there is, for example, taken a photo by means of the ground flight formation control unit 15, a film recording is started, or the enlargement of the objective of a camera 6 is changed. The cameras 6 or the objectives of the cameras 6, respectively, "view" along an optical axis 7, thus drawing, for example, on an image sensor, a picture or a film corresponding to the field of vision or range of vision of the respective camera 6. The person skilled in the art is aware of the functional principle and further details regarding photography and film recording.

The, several or every camera 6 is attached at an orientation means 8, which may be rotated at least about one axis, such as about a rotational axis 11 of the orientation means 8. The ground flight formation control unit 15 is configured to control the orientation of the optical axis 7 of the camera 6 by means of the orientation means 8, for example, by way of orientation information. The further orientation of the optical axis 7 may be achieved via a rotation of the aerial vehicle 10 about its axis of symmetry 9, whereby the optical axis 7 may be oriented in any spatial direction. The rotational axis 11 is advantageously arranged substantially orthogonally to the axis of symmetry 9. While the aerial vehicle 10 is situated in a stable, substantially static position in air space, the axis of symmetry 9 is oriented substantially perpendicularly and the rotational axis 11, as a consequence, horizontally. Alternatively, the orientation means 8 may be rotated about two or three axes, for example, if it is configured as a commercially available "gimbal". The three-axis orientation of the optical axis 7 of the camera 6 may thus be realized via the orientation of the aerial vehicle 10 and the orientation means 8 or exclusively via the orientation means 8.

Alternatively, the camera 6 may also be integrated in a housing of the aerial vehicle 10, wherein the objective, this is the optical axis 7, of the camera 6 is configured to be orientable at least in a single-axis, preferably three-axis way, for example, via a ball joint. Several, this is at least two, aerial vehicles 10 or any of the aerial vehicles 10 may alternatively have a plurality of cameras 6, for example, two to ten or more than ten, wherein the cameras 6 are attached in a stationary geometrical arrangement, preferably along an substantially plane or spiral-like orbit, at a holding means or the orientation means 8, or two or several aerial vehicles 10 may have together a plurality of cameras 8, this is at least two cameras 6, wherein the cameras are attached in a stationary geometrical arrangement, preferably along an substantially plane or spiral-like orbit, at a shared holding means or a shared orientation means. This plurality of cameras 6, which are attached in a stationary geometrical arrangement in/at the aerial vehicle/s 10, (shared) holding means or the (shared) orientation means 8, may be oriented together or independently of each other, in particular by means of the orientation means 8, and controlled by the ground flight formation control unit 15. In this way, also using relatively few aerial vehicles 10 there may be provided a plurality of recording perspectives.

The orientation information may contain, for example, angular and temporal information, this is, for example, at which angle around the axis of symmetry 9 and/or rotational axis 11 the orientation means 11 should be oriented at any given point of time. In this regard, the orientation information may be dependent on the position of the object 12 and may be temporally or spatially synchronized with the position information, whereby the orientation of the optical axis 7 of the camera 6 of each aerial vehicle 10 is and/or may be adjusted to the respective current position of the object 12.

Figure 4:
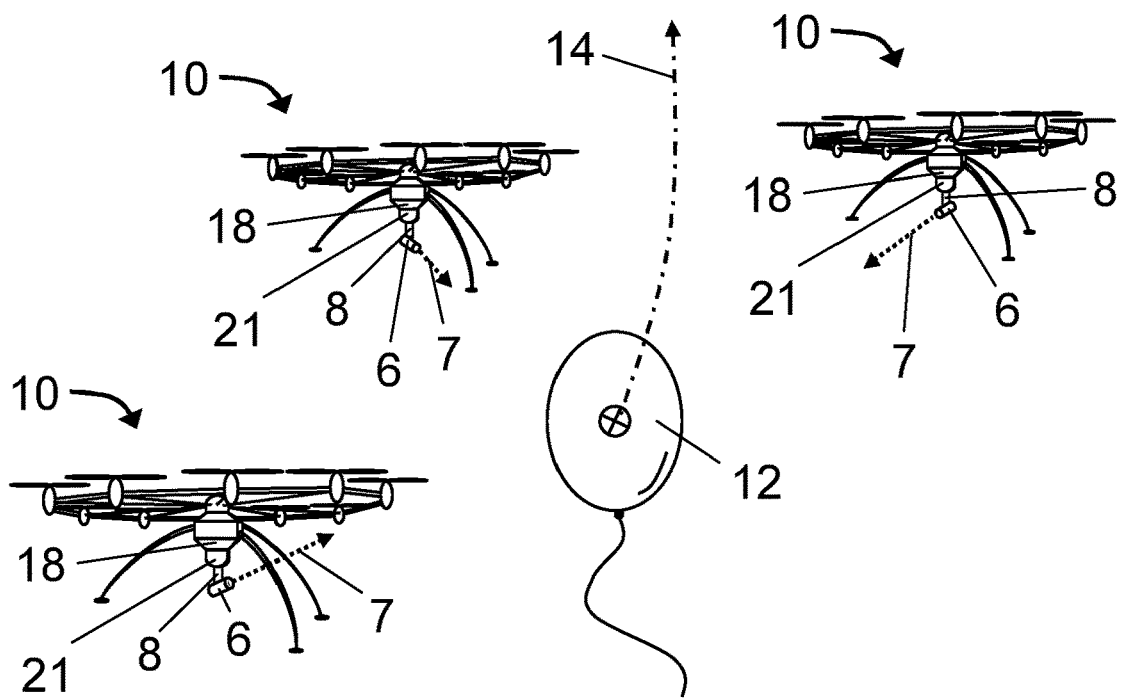
FIG. 4 shows in a schematic perspective three unmanned aerial vehicles for the use in a system according to the invention.

The orientation information of the optical axis 7 of each camera 6 may further be dependent on the orientation of the optical axes 7 of all other cameras 6 of the system. In this way, there may, for example, be prevented that there is inadvertently situated another camera 6 and/or another aerial vehicle 10 of the system 1 within the field of vision of a camera 6 of an aerial vehicle 10 by the orientation of the optical axis 7 being accordingly set and/or adjusted. This is in particular advantageous if the object 12 to be filmed is at the same or a similar height as the aerial vehicle 10, as is depicted in FIG. 4, for example.

The system 1 according to the invention, hence, enables, by means of the ground flight formation control unit 15, this is by means of the flight formation control unit, to control the flight control units 3 and the orientation means 8 during a recording of at least one moving object 12 to be filmed in a way such that (i) a spatial arrangement 13 of the aerial vehicles 10 in relation to the object 12 and (ii) the orientation of the optical axis 7 of each camera 6 in relation to the object 12 and/or in relation to the orientation/s of the optical axis/axes of the other camera/s 6 is substantially maintained and optionally also adjusted substantially in real time. For this purpose, the aerial vehicles 10 may be controlled by means of the ground flight formation control unit 15 in a flight formation in relation to a motion sequence 14, for example a drive path or a flight path, of the object 12 to be filmed. In this way, a high number, for example, 100 or more, of aerial vehicles 10 may be moved on the basis of flight formation intelligence.

"Flight formation intelligence" in this connection means specific advantages of the flight formation flight, in particular the collective movement of several individuals, in this case several aerial vehicles 10, in a flight formation by way of the movement of an individual few, in this case the object 12 to be filmed, and/or the permanent adjustment of the distances between separate individuals, in this case the individual aerial vehicles 10, in mutual dependency of the closest neighbouring individuals. "Flight formation flight" in this connection means the ability of the system 1 to move the aerial vehicles 10 in an automated way and possibly at the same distance 20 in a predetermined spatial arrangement 13 to be adjusted, through a shared (air) space.

In FIG. 1 there is further defined a flight safety zone 17, wherein the aerial vehicles 10 are controlled by means of the ground flight formation control unit 15 within this flight safety zone 17.

The above description, which is illustrated by way of the FIGS. 1 and 2, is described in the following according to an exemplary method according to the invention:

In or during a method step A) the aerial vehicles 10 were brought into the spatial arrangement 13 in relation to the object 12 to be filmed, which in this example is an automobile. The object 12, at this point of time, was in the position (N−1), which is at the ground, this is in the operational position underneath the aerial vehicles 10 that were in air space. The aerial vehicles 10 are arranged in a camera ring along a substantially planar orbit about a central axis 19, wherein the object 12 to be filmed is preferably permanently in the area of this central axis 19. The distances 20 between neighbouring aerial vehicles 10 along the orbit are substantially equal. The orbit extends at an angle of 360 degrees. The orbit may alternatively be spiral-like, extending at another angle. The spatial arrangement 13 of the aerial vehicles 10 in relation to the object 12 to be filmed is in the present example configured as a virtual cone, wherein the object 12 is substantially in the area of the tip of the cone, which in FIG. 1 coincides respectively with the positions (N−1), (N), and (N+1), and the aerial vehicles 10 are arranged at equal distances 20 in the base area of the cone, which in the present example coincides with the orbit plane, along the base area circumference.

In or during a method step B) the optical axes 7 of all cameras 6 are oriented in relation to the object 12. As in the present example, the object 12 in the operational position is underneath the aerial vehicles 10 and as it moves, an orientation in relation to the optical axes 7 of the other cameras 6 is, hence, not required, as an acceptable orientation of all optical axes 7 will be automatically the result, as soon as the cameras 6 are oriented towards the object 12.

The object 12 moves following a motion sequence 14, wherein in FIG. 1 there are illustrated three successive positions (N−1), current position (N) and (N+1) at three different points of time.

In or during a method step C) the spatial arrangement 13 of the aerial vehicles 10, by means of the ground flight formation control unit 15, is brought in relation to the moving object 12 and the orientation of the optical axis 7 of each camera 6 is maintained or adjusted in relation to the moving object 12 at any point of time substantially in real time, wherein in FIG. 1 there is separately illustrated or indicated, respectively, the spatial arrangement 13 in relation to the moving object 12 at its positions (N−1), (N), and (N+1). In this regard, the ground flight formation control unit 15 establishes at any point of time the current and/or stored position and motion direction of the object 12, adjusting flight path and orientation of the aerial object 10 as well as the orientation means 8 accordingly. This may be achieved by means of the ground flight formation control unit 15, for example, via the permanent communication of the current positions and image details, this is the fields of vision of the cameras 6, of the aerial vehicles 10 to all other aerial vehicles 10. The position information and the orientation information in this case will not only take into account the position and spatial situation of the object 12 to be filmed but rather also the positions and image details of all aerial vehicles 10 involved. Furthermore, in the calculation of each position of the aerial vehicles 10 and each orientation of the optical axis 7, the objective of the camera path desired or to be determined, respectively, of the resulting "virtual camera" will be taken into account. All parameters described above will be considered as substantial determining factors in the use of the system according to the invention and when carrying out a method according to the invention.

Determining the position of the object 12 may be realized, for example, by means of the optics of the camera 6 and the respective software, by means of distance information established by sensor units 21 (FIG. 4) of the aerial vehicles 10 or by means of positions of the object 12 to be filmed established by a position determining means 24, for example, a GPS receiver, attached at or in the object 12 to be filmed.

During the entire method, in particular during the method step C), this is also during the motion sequence 14 of the object 12, the ground flight formation control unit 15 may also control, in particular activate or deactivate, the cameras 6 of the aerial vehicles 10. In this way, by using the spatial arrangement 13 of the aerial vehicles 10 in relation to the object 12 to be filmed, illustrated in FIG. 1, there may be used, for example, the "spatial flow motion" or the "bullet time" method for recording the object 12. In this way, by movement of the entire camera ring, this is the spatial arrangement 13, through the (air) space, for example, a scene (a motion sequence 14), may be recorded, which by far exceeds the diameter of the camera ring. In this way, the object 12, this is the driving car, may be recorded in the "spatial flow motion" or the "bullet time" method if the camera ring moves at the same velocity with the scene, this is, among others, also with the motion sequence 14 of the object 12 through the (air) space. There is to be taken into account that a camera 6 does not have at any point of time the cameras 6 opposite in the camera ring or any aerial vehicles 10 in the image detail, this is in its field of vision, which is why the orientations of the optical axes 7 are synchronized with the movement of the cameras 6 in (air) space in substantially real time.

The scene and/or the motion sequence 14 may be known before a recording, and may, for example, be stored on the storage unit/s 4. A spatial arrangement, in the present case the spatial arrangement 14, may be changed at any point of time substantially in real time by changing, for example, the flight height of the aerial vehicles 10 or the orientations of the optical axes 7 of the cameras 6. During the method, the aerial vehicles 10 may assume different heights, and the cameras 6 different angles, this is different orientations of the optical axes 7.

Figure 3:
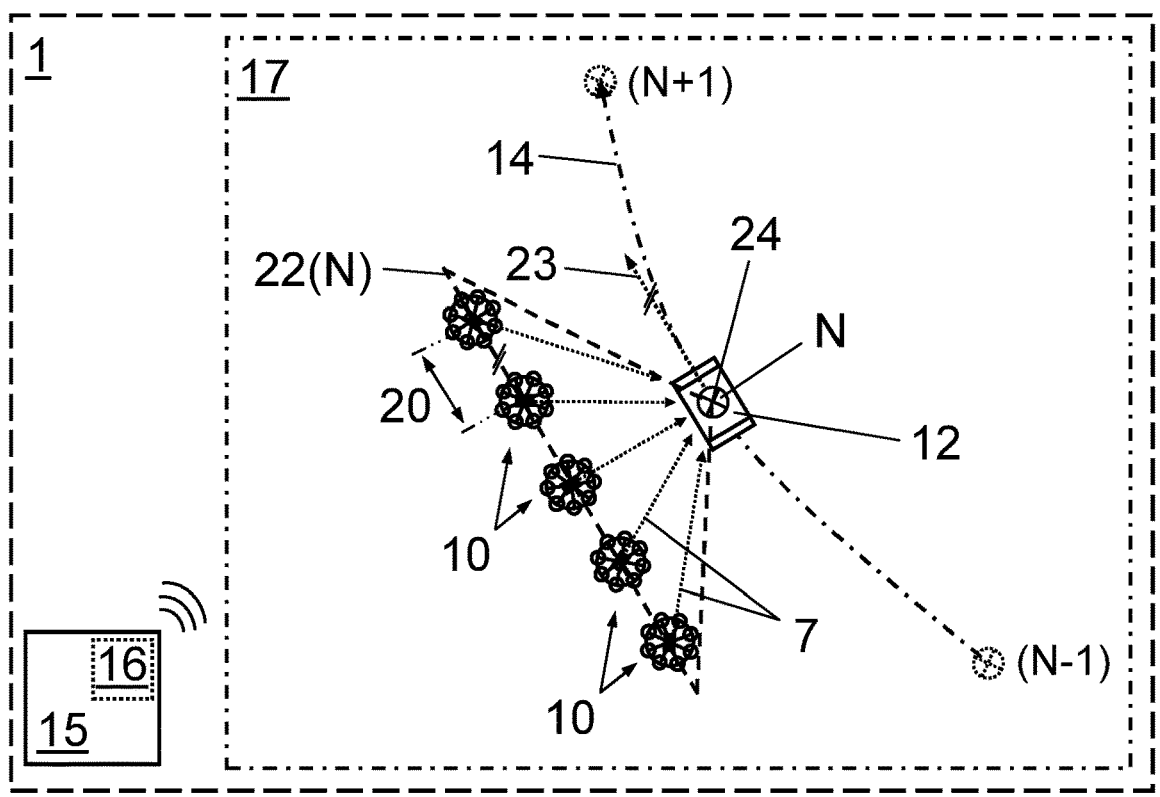
FIG. 3 shows in a schematic view from above the system according to FIG. 1.

In FIG. 3, the aerial vehicles 10 are brought into an alternative spatial arrangement 22 in relation to the object 12 to be filmed. The object 12 follows the motion sequence 14, being in the position (N) at the point of time depicted in FIG. 3, which is on the ground, this is in the operational position underneath the aerial vehicles 10 in air space. The aerial vehicles 10 are arranged along a substantially straight line, wherein the object 12 to be filmed moves at the point of time of the position (N) in a direction 23 in parallel to the line. The line may alternatively have any form. The distances 20 between neighbouring aerial vehicles 10 along the line are preferably substantially equal. The spatial arrangement 22 of the aerial vehicles 10 in relation to the object 12 to be filmed is in the present example configured as a virtual, preferably plane, isosceles triangle, wherein the object 12 is substantially in the area of a tip of the triangle, which in FIG. 3 coincides with the position (N), and wherein the aerial vehicles 10 are arranged at regular distances 20 along a side opposite to this tip.

The method or the system 1, respectively, are otherwise—except for the number of illustrated aerial vehicles 10—identical to the method or system 1, respectively, described above. In this way, using the system 1 depicted in FIG. 3 and the spatial arrangement 22 of the aerial vehicles 10 in relation to the object 12 to be filmed there may be used a simplified "spatial flow motion" or a simplified "bullet time" method for recording the object 12.

Alternatively or additionally to the ground flight formation control unit 15, each aerial vehicle 10 of a system 1 according to the invention may have its own flight formation control unit, preferably configured as a modular flight formation control unit 18. FIG. 4 shows as an example three such aerial vehicles 10, wherein the object 12 to be filmed in this example is a balloon, which is situated in air space. The modular flight formation control unit 18 may be, for example, configured to be attachable to, and optionally releasable from, a commercially available aerial vehicle 10 manufactured for a single flight, in particular a commercially available drone. This may be realized by means of any type of releasable or non-releasable attachment, for example by way of a plug, adhesive or screw-type connection. Alternatively, the modular flight formation control unit 18 may be inserted in a one-piece housing of the aerial vehicle 10, for example, accessible via a cover.

Each modular flight formation control unit 18 is configured to control the flight control unit 3 and the orientation means 8 of the associated aerial vehicle 10 and for the wireless communication with the other modular flight formation control units 18, and optionally with the ground flight formation control unit 15. In this way, the modular flight formation control units 18, this is the flight formation control units, may control the flight control units 3 and the orientation means 8 during a recording of at least one moving object 12 to be filmed substantially according to the description given above, wherein (i) the spatial arrangement 13 or 22 of the aerial vehicles 10 in relation to the object 12 and (ii) the orientation of the optical axis 7 of each camera 6 in relation to the object 12 and/or in relation to the orientation/s of the optical axis/axes 7 of the other camera/s 6 is substantially maintained and optionally adjusted substantially in real time. In this way, for example, there may be omitted, on the one hand side, a ground flight formation control unit 15, and on the other side the modular flight formation control units 18 and the ground flight formation control unit 15 may together control the aerial vehicles 10, for example, in order to provide supplementation or mutual safeguard as a backup control.

Optionally, the object 12 to be filmed may in addition be equipped with an inventive modular flight formation control unit 18 according to the preceding description.

The number of the aerial vehicles 10 illustrated in the figures, due to reasons of clarity, is smaller than in practice, wherein up to several hundred (100) of aerial vehicles may be used.

Alternatively, each aerial vehicle 10 may have additional units, for example a LED lamp, a LASER lamp, a light reflector, a firework launching device, a smoke generating device, a display, a loudspeaker, a microphone, an image recognition unit, a temperature sensor, a moisture sensor, a transport unit for goods and packets, and so on, wherein all combinations of these additional units are conceivable.

There is to be noted that an inventive aerial vehicle or system may be used as an observation system, a monitoring system and/or a rescue system, for example, in the case of a catastrophe. Hereby, the situation may be observed using the cameras by means of a large flight formation of aerial vehicles.

The term unmanned aerial vehicle is to be interpreted rather widely within the scope of this invention, and it might also comprise hot-air balloons, zeppelins, model aeroplanes or model helicopters.

The invention claimed is:

1. A system for controlling at least two unmanned aerial vehicles in a flight formation, wherein each aerial vehicle has a flight control unit for controlling the flight path of the aerial vehicle by means of a drive unit and a camera that may be rotated by means of an orientation means at least about one axis, wherein in the system there is provided at least one flight formation control unit for the wireless communication with the aerial vehicles, wherein the at least one flight formation control unit is configured to control the flight control units and the orientation means during a recording of at least one moving object that is to be filmed in such a way that a spatial arrangement of the aerial vehicles in relation to the object and the orientation of the optical axis of each camera in relation to the object and/or in relation to the orientation(s) of the optical axis(es) of the other cameras is substantially maintained and optionally adjusted substantially in real time, and that the flight formation control unit maintains and/or adjusts the orientation of the optical axis of a camera in relation to the orientation(s) of the optical axis(es) of the other camera(s) in such a way that a field of vision of this camera is free of an aerial vehicle and/or a camera of the system.

2. The system according to claim 1, wherein the at least one flight formation control unit is operable to activate, and deactivate, the cameras.

3. The system according to claim 1, wherein the aerial vehicles are arranged in the spatial arrangement along a substantially straight line, wherein the object to be filmed moves substantially in parallel to the line and the distances between neighbouring aerial vehicles are substantially equal along the line.

4. The system according to claim 1, wherein in the spatial arrangement the aerial vehicles are arranged along a substantially plane or spiral-like orbit around a central axis, wherein the object to be filmed is situated in the area of the central axis, wherein the distances between neighbouring aerial vehicles along the orbit are substantially equal and the orbit extends in an projected orbit plane at an angle in a range of about 90 degrees to about 360 degrees.

5. The system according to claim 1, wherein at least one of the aerial vehicles has at least two cameras, wherein the cameras are attached in a stationary geometrical arrangement, along a substantially plane or spiral-like orbit, at the aerial vehicle or the orientation means, or that at least two aerial vehicles together have at least two cameras, wherein the cameras are attached in a stationary geometrical arrangement, along an substantially plane or spiral-like orbit, at a shared holding means or a shared orientation means.

6. The system according to claim 1, wherein the aerial vehicles each have at least one sensor unit for establishing distance information, wherein the flight formation control unit is operable to maintain and/or adjust the arrangement of the aerial vehicles and/or of the optical axes of the cameras by way of the distance information.

7. The system according to claim 1, wherein the object to be filmed has a position determining means for establishing the positions thereof, wherein the flight formation control unit is operable to communicate wirelessly with the position determining means and is further operable to maintain and/or adjust the arrangement of the aerial vehicles and/or of the optical axes of the cameras by way of the positions of the object to be filmed.

8. The system according to claim 1, wherein each aerial vehicle has one modular flight formation control unit, which is operable to control the flight control unit and the orientation means of the aerial vehicle and to communicate wirelessly with the other flight formation control units.

9. A method for the wireless control of at least two unmanned aerial vehicles in a flight formation by means of at least one flight formation control unit, wherein each aerial vehicle has a flight control unit and a camera that may be rotated by means of an orientation means at least about one axis, wherein the at least one flight formation control unit is configured to control the flight control units and the orientation means by way of the following operations:
   A) controlling the aerial vehicles into a spatial arrangement in relation to at least one object to be filmed;
   B) orienting the optical axis of each camera in relation to the object and/or in relation to the orientation(s) of the optical axis(es) of the other camera(s); and
   C) maintaining and adjusting, substantially in real time, the spatial arrangement of the aerial vehicles in relation to the moving object and the orientation of the optical axis of each camera in relation to the moving object and/or in relation to the orientation(s) of the optical axis(es) of the other camera(s), wherein each aerial vehicle has one modular flight formation control unit and wherein in the operation C) the spatial arrangement of the aerial vehicles in relation to the moving object and the orientation of the optical axis of each camera in relation to the moving object and/or in relation to the orientation(s) of the optical axis(es) of the other camera(s) is adjusted substantially in real time by means of the flight formation control units, and the flight formation control unit maintains and/or adjusts the orientation of the optical axis of a camera in relation to the orientation(s) of the optical axis(es) of the other camera(s) in such a way that a field of vision of this camera is free of an aerial vehicle and/or a camera of the system.

10. The method according to claim 9, wherein the flight formation control unit controls, in particular activates or deactivates, the cameras of the aerial vehicles in the operation C).

11. The method according to claim 9, wherein the flight formation control unit maintains and/or adjusts the arrangement of the aerial vehicles and/or the optical axes of the cameras by way of distance information established by sensor units of the aerial vehicles.

12. The method according to claim 9, wherein the flight formation control unit maintains and/or adjusts the arrangement of the aerial vehicles and/or of the optical axes of the cameras by way of positions of the object to be filmed that are established by means of a position determining means.

* * * * *